May 10, 1927.

J. MENCHEN 1,627,709

PORTABLE FASTENING DEVICE

Original Filed Oct. 6, 1919    3 Sheets-Sheet 1

INVENTOR
Joseph Menchen
BY
ATTORNEY

May 10, 1927.
J. MENCHEN
PORTABLE FASTENING DEVICE
Original Filed Oct. 6, 1919    3 Sheets-Sheet 2
1,627,709
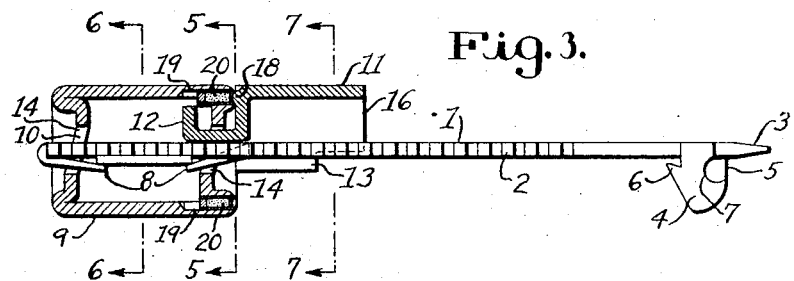
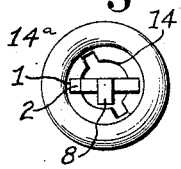
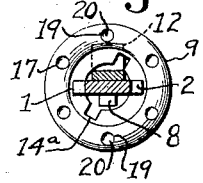
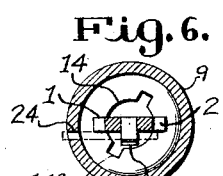
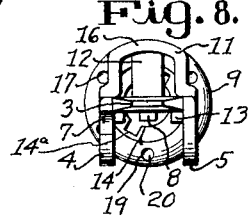
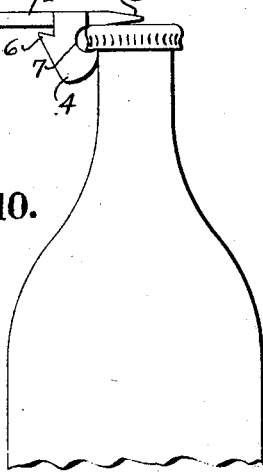
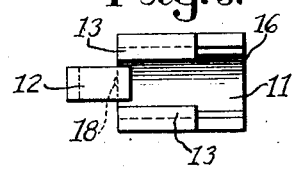
INVENTOR
Joseph Menchen
BY
ATTORNEY May 10, 1927.
J. MENCHEN
1,627,709
PORTABLE FASTENING DEVICE
Original Filed Oct. 6, 1919   3 Sheets-Sheet 3
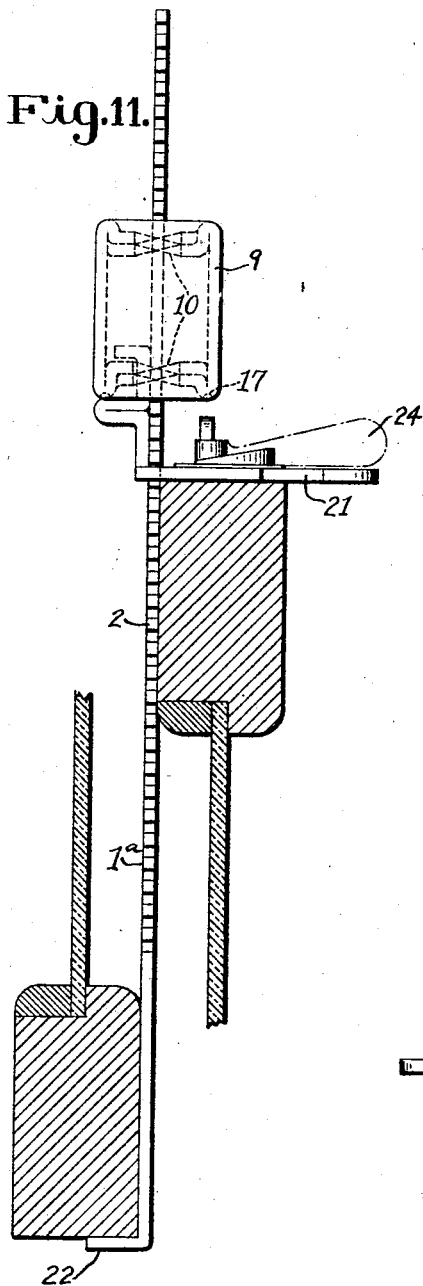
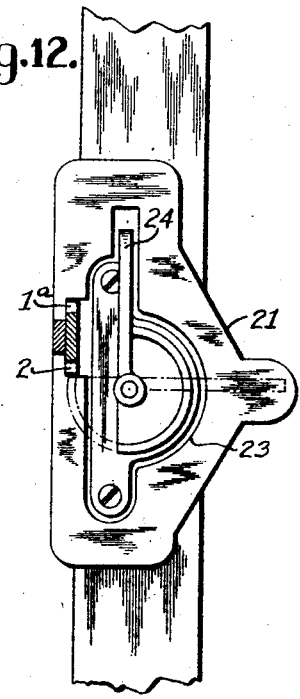
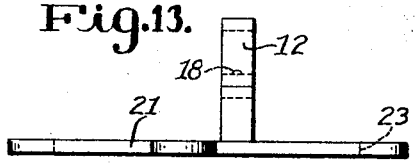
INVENTOR
Joseph Menchen
BY
ATTORNEY Patented May 10, 1927.

1,627,709

UNITED STATES PATENT OFFICE.

JOSEPH MENCHEN, OF SUMMIT, NEW JERSEY.

PORTABLE FASTENING DEVICE.

Continuation of application Serial No. 328,736, filed October 6, 1919. This application filed July 9, 1921, Serial No. 483,408. Renewed October 8, 1926.

This invention relates to a portable fastening implement for doors, windows, and the like, and has for its object the provision of a simple, cheaply manufactured, effective, durable, and non-tamperable device, adapted to be applied either to a door, in addition to or default of the usual locks or bolts to insure against unauthorized entry into an apartment or dwelling, or to a window for the purpose of locking the sashes at any desired degree of opening. In the one embodiment, the device comprises a toothed shank or bar adapted to be placed between the door-jamb and door and having means for engaging a socket of the jamb, a thrust or contact member non-rotatively slidable on the shank to bear against the face of the door, and an operating member freely slidable and also rotatable on the shank and coupled to the thrust member, the operating member being adapted to cooperate with the teeth of the shank after the manner of an ordnance nut with its screw, so as to force the thrust member against the door and the latter against the stop of the door-jamb by virtue of the purchase secured by the portion of the shank caught in the jamb. In the other embodiment of the invention the shank is provided with means for engagement with the top of the lower sash and the thrust or contact member is formed so as to be secured on the top of the upper sash, the degree of opening of the sashes being determined by the position to which the members are slid along the shank, and the turning of the operating member in engagement with the teeth of the shank at the desired position serving to fasten the whole in fixed relation.

A further object of the invention is to provide a portable fastening device of this general character which will give audible warning by causing a detonation or detonations in event of an attempt to force the door or window. To this end the device may be said to comprise, broadly, relatively movable, cooperative members adapted to engage the door and jamb or the relatively movable sashes and having means for locking them in fixed relation, together with an explosive cartridge or cartridges in one of the members adapted and arranged to be undisturbed by any ordinary manipulation but to be exploded by excessive stress between the members. In the preferred construction of the device, these cartridges or explosive charges may be located in the portion of the operating member opposed to the pressure member, which latter will act as a firing element under heavy pressure of blows.

A still further object is to provide an alarm system whereby the user can tell or be informed of an attempt to force entrance into his room or domicile through noise-making means forming a part of this device.

Further advantages of construction will be brought out in the specification and illustrated in the drawings forming a part thereof, in which drawings—

Fig. 3 is a plan view, partly in section, showing the various members secured together to form a permanent grip when using this device for other purposes;

Fig. 4 is an end view of Fig. 3;

Figure 1:
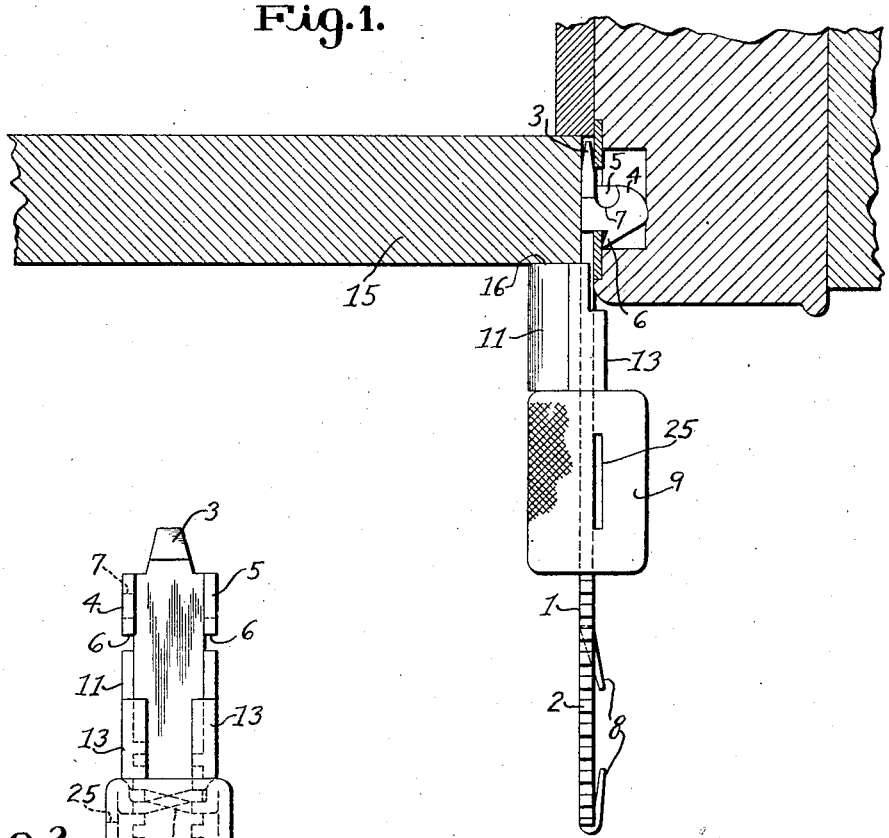
Fig. 1 is a top plan view of the device, showing the same in cooperation with a closed door and door-jamb, said door and jamb being shown in section.
Figure 2:
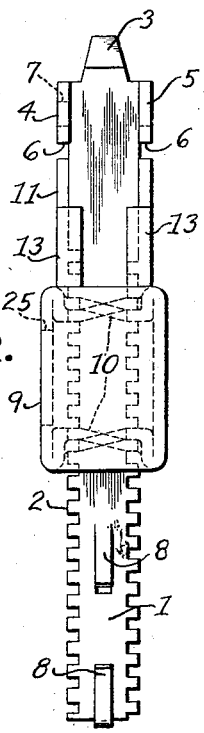
Fig. 2 is a side elevation of the device detached from the door.

Figs. 5, 6 and 7 are sections on the lines 5—5, 6—6 and 7—7, respectively, of Fig. 3;

Fig. 8 is another end elevation of Fig. 3;

Fig. 9 is a detail of one of the elements of this device;

Fig. 10 is a side elevation of the device, showing its use as a bottle-opener;

Fig. 11 is a side elevation of the device as used for a window fastener, the sash and glass being shown in section;

Fig. 12 is a top plan view of the same; and

Fig. 13 is a detail of one of the elements.

In the drawings, 1 is a flat shank or bar having teeth 2 cut along its opposite edges, and provided at one end with a beveled-off blade-tip portion 3. Spaced, parallel, opposed ears 4 and 5 are formed near the forward end of the shank 1, said ears projecting from one of the flat sides of the shank and having beveled spur projections 6 on their rear edges. One of said ears may also have a forward cut-out portion 7 to form a hook. The other end of the shank is desirably provided with ears 8 punched up slightly from one face and projecting toward each other.

Cooperating with the shank 1 is a barrel or operating member 9, preferably knurled on its outer surface, and provided at its ends with internal flanges having circular openings 14 formed with partial helices 10, 11 and key-hole slots 14ᵃ permitting the barrel to be moved straight along the shank, said partial helices being adapted to coact with the teeth 2 on the shank after the manner of a screw and ordnance nut. A non-revoluble thrust or contact member 11 having a hook 12 at its rear end is slidably mounted on the shank 1, between the barrel 9 and the hooks 4, 5. The hook 12 is inserted through one of the circular end openings 14 in the barrel 9, so as to couple the members as to longitudinal movement, while permitting the barrel to turn relatively to the contact member.

In the construction illustrated in Figs. 1 to 10, the contact member is made in such form that its forward portion 16 lies at one side of the shank 1, that is to say the flat side opposite to that from which the ears 4 and 5 project. As illustrated it is of approximately U-shaped cross-section, embracing the toothed edges of the shank, with internal longitudinal grooves receiving these edges and slide bearing flanges 13 overlying the exposed flat side of the shank adjacent the barrel.

The operation of the device is as follows: The forward portion of the shank is placed flat against the door-jamb, with the ears entered into the lock-plate socket, and their spurs 6 hooked over the edge of the plate opening, the members 9 and 11 being sufficiently withdrawn so as to permit the door 15 to clear the forward end 16 of the sliding thrust or contact member. The portion 16 of the contact member being at the side of the shank away from the ears 4, 5, clears the projection of the door-jamb, as seen in Fig. 1. After placing the device in this manner, the door is closed, which secures the shank and its ears 4 and 5 between the door 15 and the door-jamb 16, whereupon the barrel 9 and the member 11 are pushed as close to the door as possible, and the barrel is then turned in a nut-like manner, the partial helices or spiral cams 10 cooperating with the teeth 2 on the sides of the shank to thrust the member 11 tightly against the door. In this way a very effective fastening is produced, preventing opening of the door.

For the purpose of preventing any tendency of the nut member 9 to jar loose by rotation, a circular series of slight depressions 17 are formed in the end of the member 9, such depressions cooperating with one or more humps 18 on the member 11.

When using this device as an alarm in conjunction with the fastening feature, sockets 19 may be provided in the forward end of the member 9, for the reception of blank cartridges or explosive charges 20. These cartridges are of such character as not to be exploded by pressure considerably in excess of that developed in the intended use of the device, but if after the member 9 has been screwed up sufficiently to effectively fasten the door, an attempt is made to force the same from the outside, either by pressure being placed thereon or by jimmying, the excessive force thus applied through the member 11 will cause one or more of the blank cartridges to explode, thereby notifying the occupant of the room, and probably the occupants of adjoining rooms, that some one is endeavoring to gain unwarranted admission. As indicated in the drawing, the cartridges may be located immediately behind the depressions 18, in which event the humps 18 serve as firing pins.

As applied to windows, a slight modification of the member 11 is resorted to, and this structure is clearly illustrated in Figs. 11 to 13 of the drawings wherein 21 is a contact plate corresponding to the contact member 11 in the door fastening, the other elements being substantially identical, with the exception that the shank 1ᵃ is longer and is provided at one of its ends with a turned-over portion 22 for grasping the bottom of the upper sash, instead of having the ears 4, 5 of the other form. It will be perceived that with this device the window can be fastened in any position, that is, either entirely closed or partly opened. The plate 21 has an opening 23 which slips over the ordinary form of sash-fastener, and is adapted to be held firmly to the top of the upper sash by the locking arm 24 of such fastener.

Returning to Figs. 1 to 10 it will be seen that the barrel 9 can be slid to the rear end of the shank, whereby a coin inserted in a slot 25 in the barrel and between and under the ears 8, the member 9 will secure the barrel against relative rotation on the shank and the device may be used as an efficient screw-driver. Reference being had to Fig. 10 of the drawings, it will also be seen that by using the hook 7 the device can be used as a bottle-opener.

I do not wish to limit myself to any particular form illustrated, but various modifications may be resorted to within the scope of my invention.

The subject-matter of this application is a continuation of my application filed October 6, 1919, Serial No. 328,736.

I claim:

1. As an article of manufacture, a portable fastening device comprising a shank having ears near one end, teeth along both edges, a sliding member, and a revoluble member having partial helices at both ends to cooperate with said teeth.

2. As an article of manufacture, a portable fastening device comprising a shank having ears near one end, teeth along both edges of said shank, a sliding member, a revoluble member having partial helices at both ends and means for holding said sliding and revoluble members in fixed relation.

3. As an article of manufacture, a portable fastening device comprising a shank having ears near one end, teeth along both edges, a sliding member, a revoluble member having partial helices at both ends to cooperate with said teeth, and means on said sliding member to connect it with said revoluble member.

4. As an article of manufacture, a portable fastening device comprising a shank having ears near one end, teeth along both edges, a sliding member, a revoluble member having partial helices at both ends to cooperate with said teeth, and a hook on said sliding member to connect it with said revoluble member.

5. As an article of manufacture, a portable fastening device comprising a shank having ears near one end, teeth along both edges, a sliding member, a revoluble member having partial helices at both ends to cooperate with said teeth, and depressions in said revoluble member to cooperate with humps on said sliding member.

JOSEPH MENCHEN.